No. 756,295. Patented April 5, 1904.

UNITED STATES PATENT OFFICE.

VIRGE STEGER, OF BONHAM, TEXAS.

ARTIFICIAL STONE.

SPECIFICATION forming part of Letters Patent No. 756,295, dated April 5, 1904.

Application filed November 20, 1903. Serial No. 182,016. (No specimens.)

*To all whom it may concern:*

Be it known that I, VIRGE STEGER, a citizen of the United States, residing at Bonham, in the county of Fannin and State of Texas, have invented new and useful Improvements in Artificial Stone, of which the following is a specification.

This invention relates generally to artificial stone, and particularly to a composition of matter for making bricks.

The object of the invention is in a ready, feasible, and inexpensive manner to present bricks which shall be capable of presenting the same resistance to pressure as ordinary clay bricks, which shall be non-hygroscopic, and which may be colored according to the requirements of the case.

With these and other objects in view, as will appear as the nature of the invention is better understood, the same consists in the novel composition of matter for the production of artificial stone or bricks, as will be hereinafter described and claimed.

In carrying the invention into effect the following ingredients are employed: sand, ninety-three per cent.; unslaked lime, seven per cent. These ingredients are thoroughly mixed in a pug-mill or any other mixing-machine and are then moistened with a solution of carbonate of soda and water in proportion of eight pounds of the soda to one hundred gallons of water. After being thoroughly mixed and formed into the desired shape the article is placed in a sealed compartment and subjected to steam heat for ten hours, more or less, the steam being passed through a compartment containing nine pounds of caustic potash and eight pounds of flowers of sulfur. The proportions above given are those that will obtain in the manufacture of fifteen thousand bricks; but it will be understood that the proportions stated may be varied or changed, if found necessary or desirable. The soda-and-potash solution acts on the silica in the sand and lime, and by the heat and pressure employed forms silico-calcareous limestone, and the sulfur, in combination with the potash, forms potassium sulfid, the compound thus formed operating to harden the product and bleach it. In the process of manufacture any desired coloring material may be employed, as by adding any mineral paint to the soda solution.

The article produced from the composition of matter described will withstand pressure, is not affected by heat and cold, is non-hydroscopic in character, will not disintegrate with age, and can be readily manufactured without the employment of expensive or any special kind of machinery.

Having thus described the invention, what I claim is—

1. A composition of matter for the manufacture of bricks or other building material, consisting of sand, lime, carbonate of soda, caustic potash, and flowers of sulfur.

2. The composition of matter for the manufacture of bricks, or the like, consisting of sand, ninety-three per cent., lime seven per cent., and carbonate of soda and water in proportion of eight pounds of soda to one hundred gallons of water.

3. The herein-described method of making artificial bricks, or the like, which consists in mixing together sand, lime and a solution of carbonate of soda, then subjecting the mixture, after being shaped, to steam, treated with caustic potash and flowers of sulfur.

4. The herein-described method of making artificial bricks, which consists in mixing ninety-three parts of sand and seven parts of lime, then adding a solution of carbonate of soda and water in proportion of eight pounds of the soda to one hundred gallons of water, then forming the mixture into bricks or the like, then subjecting the article to the action of steam for ten hours more or less, the steam being previously brought into contact with a mixture of caustic potash and flowers of sulfur.

5. The herein-described method of making artificial bricks, which consists in mixing ninety-three parts of sand and seven parts of lime, then adding a solution of carbonate of soda and water in proportion of eight pounds of the soda to one hundred gallons of water, then forming the mixture into bricks or the like, then subjecting the article to the action of steam for ten hours more or less, the steam being previously subjected to nine pounds of caustic potash and eight pounds of flowers of sulfur.

In testimony whereof I have hereunto set my hand in presence of two subscribing witnesses.

VIRGE STEGER.

Witnesses:
   CHAS. E. FOSTER,
   THOS. P. STEGER.